United States Patent
Opferman et al.

(10) Patent No.: US 12,393,427 B2
(45) Date of Patent: Aug. 19, 2025

(54) CORE-BASED SPECULATIVE PAGE FAULT LIST

(71) Applicant: Intel Corporation, Santa Clara, CA (US)

(72) Inventors: Toby Opferman, Portland, OR (US); Michael W. Chynoweth, Placitas, NM (US); Rajshree A. Chabukswar, Sunnyvale, CA (US); Vijay C. Bahirji, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 819 days.

(21) Appl. No.: 17/482,944

(22) Filed: Sep. 23, 2021

(65) Prior Publication Data

US 2023/0091167 A1    Mar. 23, 2023

(51) Int. Cl.
*G06F 9/38* (2018.01)
*G06F 9/30* (2018.01)

(52) U.S. Cl.
CPC ........ *G06F 9/3844* (2013.01); *G06F 9/30145* (2013.01); *G06F 9/3802* (2013.01); *G06F 9/3861* (2013.01)

(58) Field of Classification Search
None
See application file for complete search history.

(56) References Cited

U.S. PATENT DOCUMENTS

| | | |
|---|---|---|
| 6,175,898 B1 | 1/2001 | Ahmed et al. |
| 2006/0248280 A1 | 11/2006 | Al-Sukhni et al. |
| 2007/0294482 A1 | 12/2007 | Kadambi et al. |
| 2011/0320749 A1* | 12/2011 | Gonion ............... G06F 12/1027 711/E12.001 |
| 2013/0339693 A1* | 12/2013 | Bonanno ............. G06F 9/30047 712/238 |
| 2016/0179544 A1 | 6/2016 | Heinecke et al. |
| 2018/0088952 A1 | 3/2018 | Cocco et al. |
| 2019/0130102 A1* | 5/2019 | Johnson ............... G06F 12/1045 |

OTHER PUBLICATIONS

Extended European Search Report from European Patent Application No. 22185076.1 notified Jan. 3, 2023, 9 pgs.

* cited by examiner

*Primary Examiner* — Michael Sun
(74) *Attorney, Agent, or Firm* — Essential Patents Group, LLP

(57) ABSTRACT

An embodiment of an integrated circuit may comprise an instruction decoder to decode one or more instructions to be executed by a core, and circuitry coupled to the instruction decoder, the circuitry to determine if a decoded instruction involves a page to be fetched, and determine one or more hints for one or more optional pages that may be fetched along with the page for the decoded instruction. Other embodiments are disclosed and claimed.

9 Claims, 15 Drawing Sheets

```
Addr00 test    rcx,rcx

Addr01 je      notepad!WinMain+0x2d5 (Addr06)

Addr02 mov     rax,qword ptr [rcx]           ⇐ 1

Addr03 mov     rax,qword ptr [rax+10h]       ⇐ 2

Addr04 call    qword ptr [AddrX1]            ⇐ 3

Addr05 mov     qword ptr [AddrX2],r12        ⇐ 4

Addr06 mov     rcx,qword ptr [AddrX3]        ⇐ 5

Addr07 test    rcx,rcx

Addr08 je      Addr10

Addr09 call    qword ptr [AddrX4]            ⇐ 6

Addr10 mov     rcx,qword ptr [AddrX5]

Addr11 test    rcx,rcx

Addr12 je      Addr14

Addr13 call    qword ptr [AddrX6]

Addr14 xorps   xmm0,xmm0

Addr15 movdqa  xmmword ptr [AddrX3],xmm0
```

FIG. 4

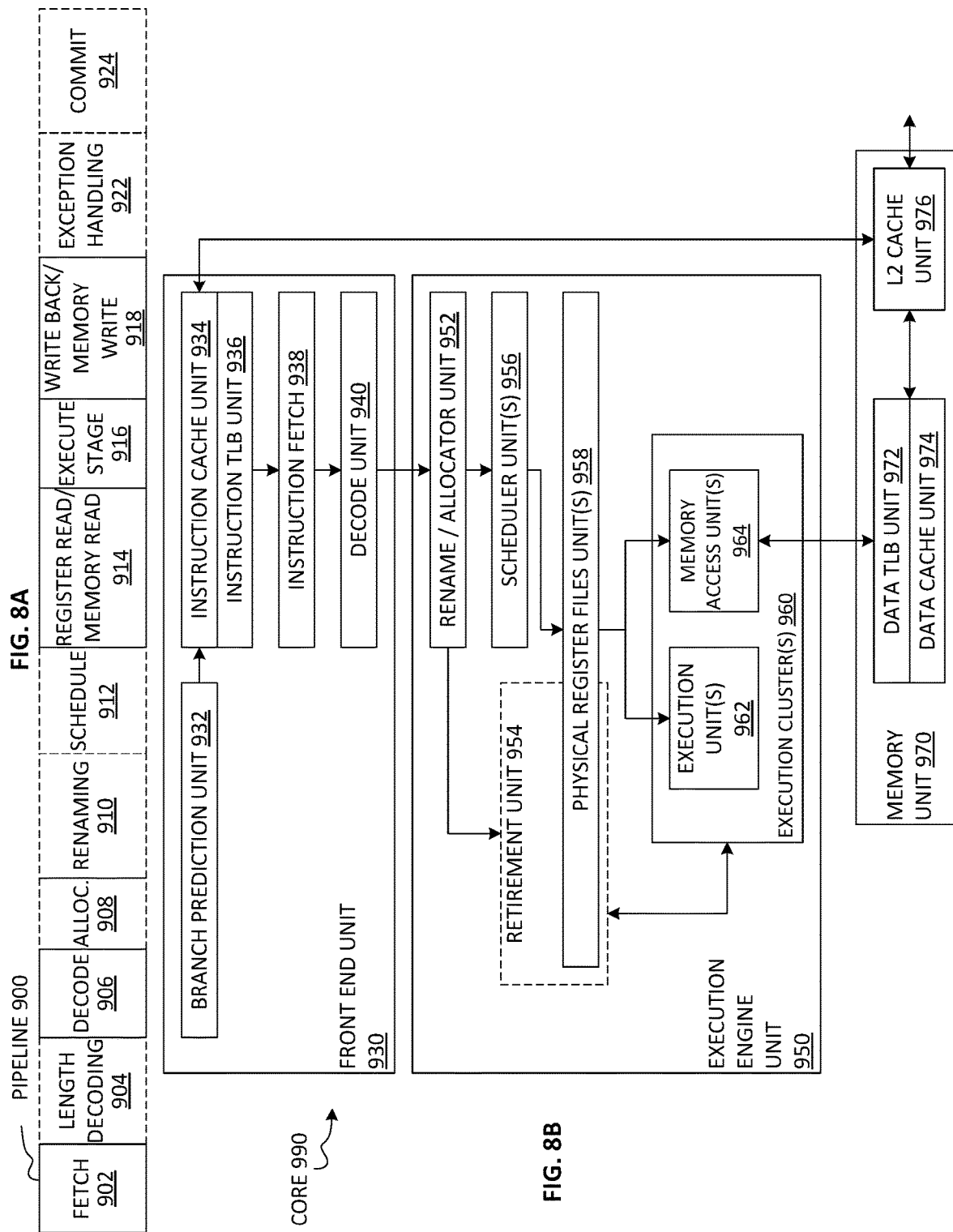

CORE-BASED SPECULATIVE PAGE FAULT LIST

BACKGROUND

1. Technical Field

This disclosure generally relates to processor technology, instruction decode technology, and speculative page fault technology.

2. Background Art

Some central processor unit (CPU) cores may utilize speculative execution to avoid pipeline stalls and achieve better performance, which allows execution to continue without having to wait for the architectural resolution of a branch target. Instructions may be speculatively decoded to support such speculative execution. Branch prediction technology utilizes a digital circuit that guesses which way a branch will go before the branch instruction is executed. Correct predictions/guesses improve the flow in the instruction pipeline. In general, a branch prediction for a conditional branch may be understood as a prediction for the branch as "taken" vs. "not-taken." A branch prediction unit (BPU) may support speculative execution by providing branch prediction for a frond-end of a CPU based on the branch instruction pointer (IP), branch type, and the control flow history (also referred as branch history) prior to the prediction point.

BRIEF DESCRIPTION OF THE DRAWINGS

The various embodiments of the present invention are illustrated by way of example, and not by way of limitation, in the figures of the accompanying drawings and in which:

FIG. 4 is an illustrative diagram of an example listing of pseudo-code according to an embodiment;

FIG. 8A is a block diagram illustrating both an exemplary in-order pipeline and an exemplary register renaming, out-of-order issue/execution pipeline according to embodiments of the invention;

FIG. 8B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
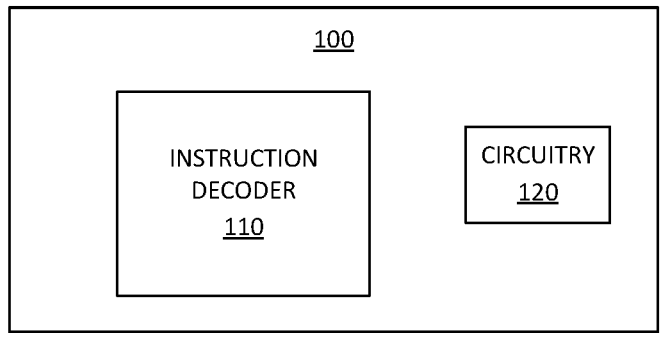
FIG. 1 is a block diagram of an example of an integrated circuit according to an embodiment.

Embodiments discussed herein variously provide techniques and mechanisms for core-based page fault speculation. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to decode instructions.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide technology for a core-based speculative page fault list. In a computer system, frequent consecutive page faults may cause loss of performance. On frequent page faults to the same memory range, software may extend from faulting in a single page at a time to multiple consecutive pages of that same range up to a maximum size. A problem is that the software typically needs to identify a pattern before performing this operation. Another problem is that software conventionally can only extend faulting multiple consecutive pages to a certain size to be on the conservative side. Another problem is that the software conventionally only considers the single page range of the page that caused the fault. For example, upon faulting on an invalid address, a conventional processor will provide the faulted address to the software page fault hander. The software page fault handler will then determine the course of action, but the software is not able to consider unrelated pages as predictions to fault in. Some embodiments provide technology to overcome one or more of the foregoing problems.

Some embodiments provide technology to provide additional hints, optional addresses, or otherwise speculative information from the processor to the software page fault handler. For example, the speculative information may include an optional contiguous size of the faulted address to fault in along with a possible scatter gather list of additional addresses and sizes which may benefit to fault in at the same time. Advantageously, an operating system (OS) may improve or better optimize memory usage by faulting in data as needed. In workloads that perform frequent data accesses and allocations, for example, page faults may consume a significant amount of cycles if every other instruction is faulting to bring in a new page. Some embodiments advantageously provide technology such that a single fault may reduce having a subsequent number of faults based on hints provided by the processor to the software fault handler.

With reference to FIG. 1, an embodiment of an integrated circuit 100 may include an instruction decoder 110 to decode one or more instructions (e.g., assembly code level instructions, microcode level instructions, micro-architecture level instructions, etc.) to be executed by a core, and circuitry 120 coupled to the instruction decoder 110. The circuitry 120 may be configured to determine if a decoded instruction involves a page to be fetched, and determine one or more hints for one or more optional pages that may be fetched along with the page for the decoded instruction. In some embodiments, the one or more hints may comprise a speculative page fault list of optional pages that may be fetched. For example, the circuitry 120 may be configured to look ahead at one or more instructions to be decoded to add one or more optional pages that may be fetched to the speculative page fault list.

In some embodiments, the one or more hints may comprise a speculative size of memory that may be fetched for one or more of the page to be fetched and an optional page that may be fetched, where the speculative size is greater than a single page size. For example, the one or more hints may comprise a speculative page fault list of additional speculative addresses of pages that may be fetched together with respective speculative sizes for the address of the page to be fetched for the decoded instruction and the additional speculative addresses. In some embodiments, the circuitry 120 may be further configured to determine a hint for at least one additional page that may be fetched that is unrelated to the page to be fetched for the decoded instruction. In any of the embodiments herein, the circuitry 120 may also be configured to provide the one or more hints from the core to a page fault handler (e.g., a software page fault handler that is part of an OS).

Figure 14:
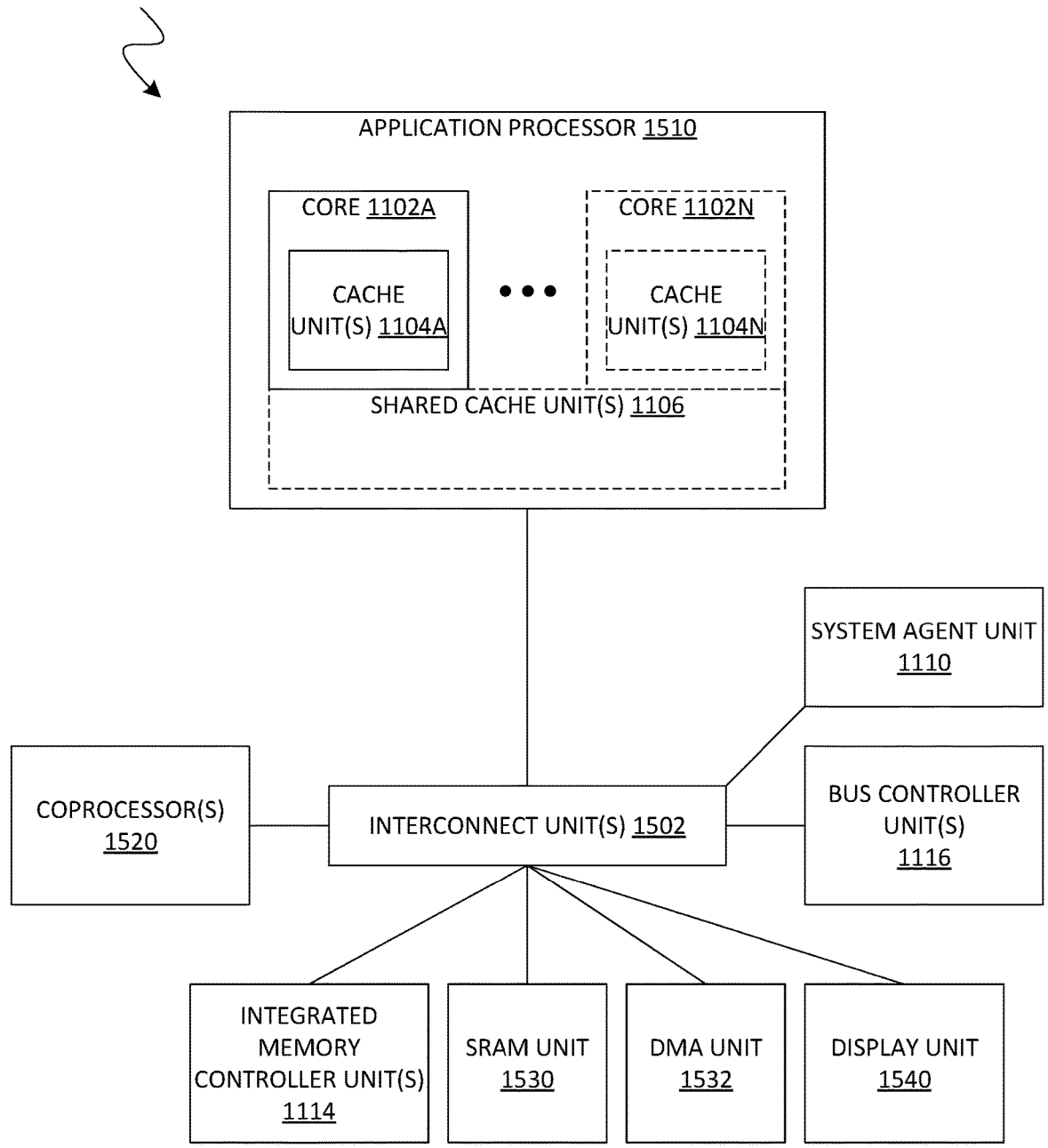
Figure 15:
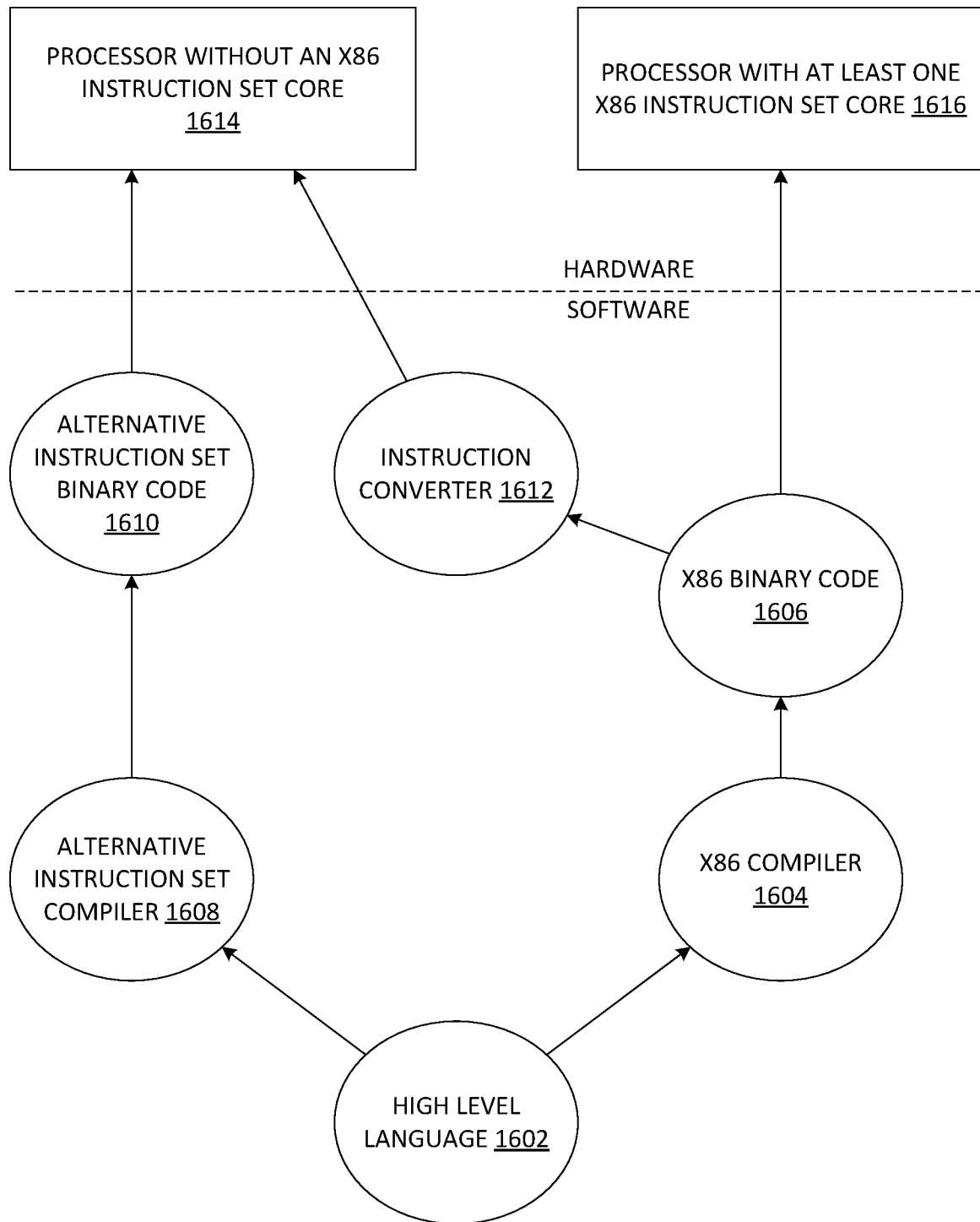
FIG. 15 is a block diagram contrasting the use of a software instruction converter to convert binary instructions in a source instruction set to binary instructions in a target instruction set according to embodiments of the invention.

Embodiments of the integrated circuit 100, including the instruction decoder 110, and/or the circuitry 120, may be incorporated in a processor such as those described herein including, for example, the core 990 (FIG. 8B), the cores 1102A-N (FIGS. 10, 14), the processor 1210 (FIG. 11), the co-processor 1245 (FIG. 11), the processor 1370 (FIGS. 12-13), the processor/coprocessor 1380 (FIGS. 12-13), the coprocessor 1338 (FIGS. 12-13), the coprocessor 1520 (FIG. 14), and/or the processors 1614, 1616 (FIG. 15). In particular, embodiments of the instruction decoder 110, and/or the circuitry 120 may be incorporated in the front end unit 930 (FIG. 8B).

Figure 2A:
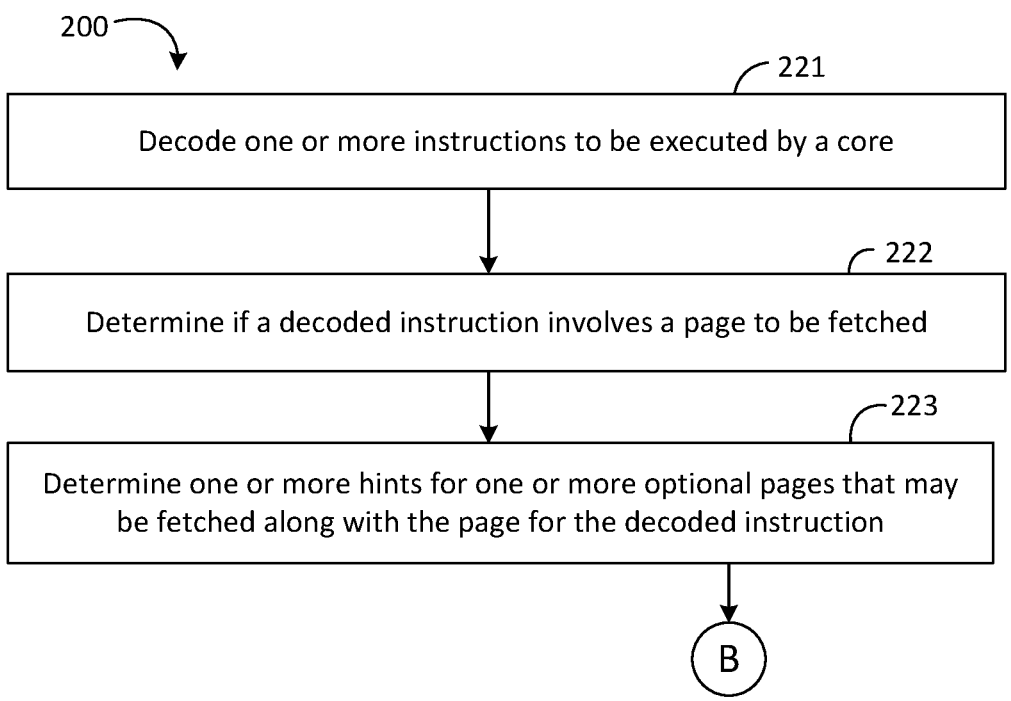
FIGS. 2A to 2B are flow diagrams of an example of a method according to an embodiment.
Figure 2B:
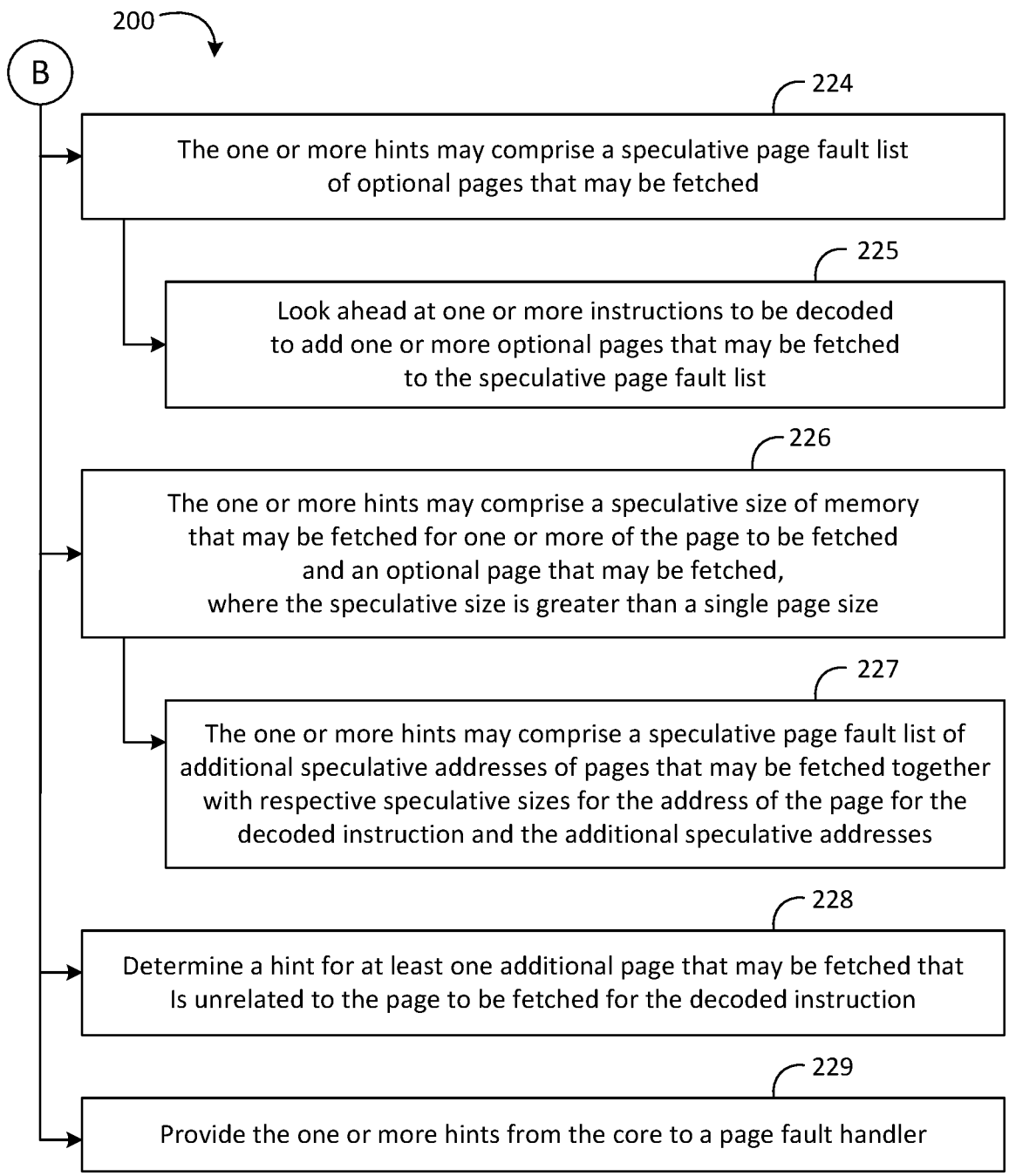

With reference to FIGS. 2A to 2B, an embodiment of a method 200 may include decoding one or more instructions to be executed by a core at box 221, determining if a decoded instruction involves a page to be fetched at box 222, and determining one or more hints for one or more optional pages that may be fetched along with the page for the decoded instruction at box 223. In some embodiments of the method 200, the one or more hints may comprise a speculative page fault list of optional pages that may be fetched at box 224. For example, the method 200 may further include looking ahead at one or more instructions to be decoded to add one or more optional pages that may be fetched to the speculative page fault list at box 225.

In some embodiments of the method 200, the one or more hints may comprise a speculative size of memory that may be fetched for one or more of the page to be fetched and an optional page that may be fetched, where the speculative size is greater than a single page size at box 226. For example, the one or more hints may comprise a speculative page fault list of additional speculative addresses of pages that may be fetched together with respective speculative sizes for the address of the page for the decoded instruction and the additional speculative addresses at box 227. Some embodiments of the method 200 may also include determining a hint for at least one additional page that may be fetched that is unrelated to the page to be fetched for the decoded instruction at box 228, and/or providing the one or more hints from the core to a page fault handler at box 229 (e.g., an OS page fault handler).

Embodiments of the method 200 may be performed by a processor such as those described herein including, for example, the core 990 (FIG. 8B), the cores 1102A-N (FIGS. 10, 14), the processor 1210 (FIG. 11), the co-processor 1245 (FIG. 11), the processor 1370 (FIGS. 12-13), the processor/coprocessor 1380 (FIGS. 12-13), the coprocessor 1338 (FIGS. 12-13), the coprocessor 1520 (FIG. 14), and/or the processors 1614, 1616 (FIG. 15).

Figure 3:
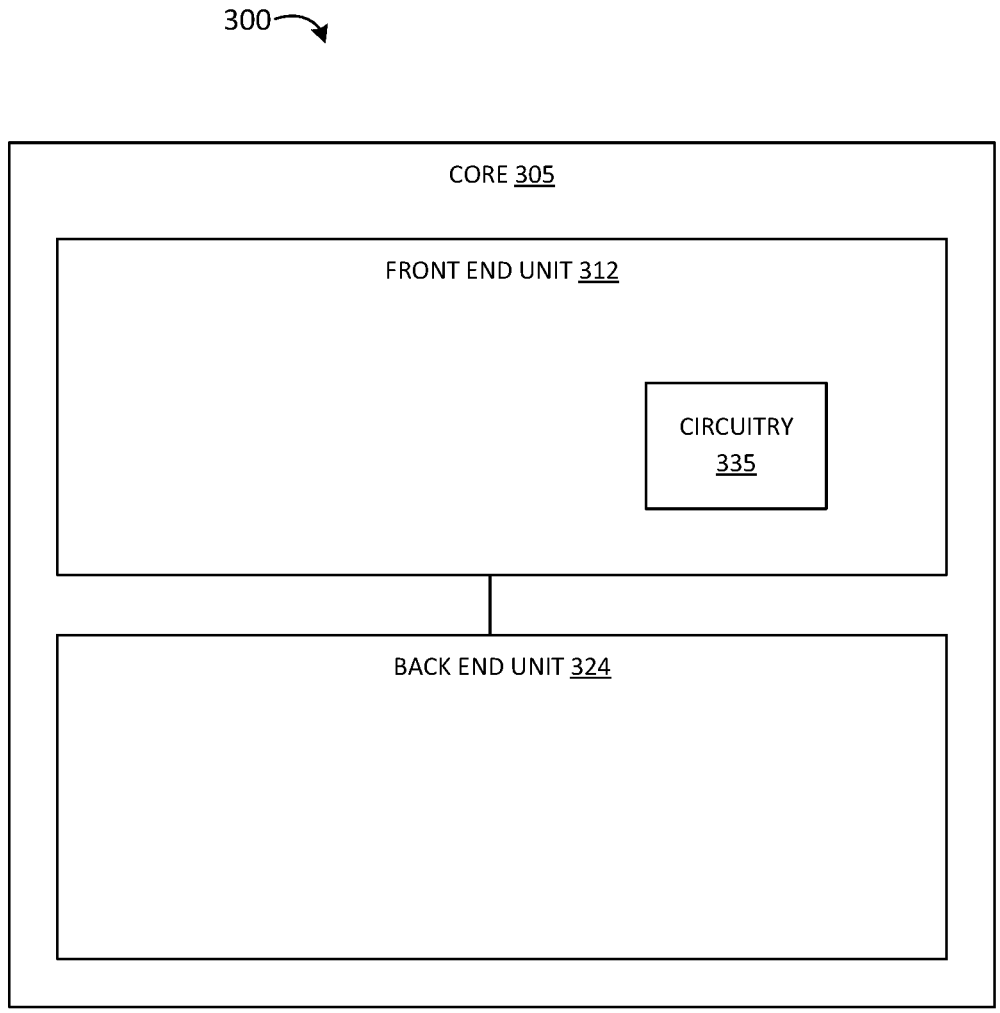
FIG. 3 is a block diagram of an example of an apparatus according to an embodiment.

With reference to FIG. 3, an embodiment of an apparatus 300 may include a core 305 with a front end unit 312 to decode one or more instructions and a back end unit 324 communicatively coupled to the front end unit 312 to execute the one or more decoded instructions. The front end unit 312 may include circuitry 335 to determine if a decoded instruction involves a page to be fetched, and determine one or more hints for one or more optional pages that may be fetched along with the page for the decoded instruction. In some embodiments, the one or more hints may comprise a speculative page fault list of optional pages that may be fetched. For example, the circuitry 335 may be configured to look ahead at one or more instructions to be decoded to add one or more optional pages that may be fetched to the speculative page fault list.

In some embodiments, the one or more hints may comprise a speculative size of memory that may be fetched for one or more of the page to be fetched and an optional page that may be fetched, where the speculative size is greater than a single page size. For example, the one or more hints may comprise a speculative page fault list of additional speculative addresses of pages that may be fetched together with respective speculative sizes for the address of the page to be fetched for the decoded instruction and the additional speculative addresses. In some embodiments, the circuitry 335 may be further configured to determine a hint for at least one additional page that may be fetched that is unrelated to the page to be fetched for the decoded instruction. In any of the embodiments herein, the circuitry 335 may also be configured to provide the one or more hints from the core 305 to a page fault handler (e.g., an OS page fault handler).

Embodiments of the front end unit 312, the back end unit 324, and/or the circuitry 335, may be incorporated in a processor such as those described herein including, for example, the core 990 (FIG. 8B), the cores 1102A-N (FIGS. 10, 14), the processor 1210 (FIG. 11), the co-processor 1245 (FIG. 11), the processor 1370 (FIGS. 12-13), the processor/coprocessor 1380 (FIGS. 12-13), the coprocessor 1338 (FIGS. 12-13), the coprocessor 1520 (FIG. 14), and/or the processors 1614, 1616 (FIG. 15).

In a typical page fault scenario, the processor will fault on an access to a specific page and then the address is delivered to the page fault handler. A conventional processor provides a minimal set of attributes about the fault, such as read or write, and the page fault handler then determines any actions. In contrast, an embodiment of a processor advantageously provides additional information as hints to the page fault handler, that the page fault handler may optionally utilize to improve performance where possible. Embodiments of such hints may take any useful form. In one example, a hint may be in the form of indicating an additional size of memory for the address faulted on. For example, the processor may determine an estimate of the amount of additional memory that may need to be brought in. Based on the estimated, the additional size of memory may be provided as a hint to the page fault handler (e.g., indicated in bytes, a number of pages, etc.). In another example, a hint may be in the form of a list of additional pages that may be considered to additionally be brought in by the page fault handler. The list of additional pages may represent a "best" estimate. For example, if linear address space separation (LASS) is enabled, any kernel range address generated in user mode would be ignored and not passed through.

In general, the processor may be configured to predict future faults and provide various forms of hints to reduce or prevent such future faults with a single fault provided to the page fault handler along with the hints. The hints are to be considered optional by the page fault handler and are not required to be guaranteed, accurate, or correct. The page fault handler does not generate a fault passed solely on these hints, because the hints are speculative. The page fault handler still has the ultimate decision on what hints could or should be honored.

With reference to FIG. 4, an example of pseudo-code illustrates some principles of the embodiments described herein. In a worst case example, a conventional processor may fault on every first access to a page in the sequence (e.g., requesting a page fault at each of arrows 1 through 6 in FIG. 4). In accordance with an embodiment, if the instruction decoded at arrow 1 causes a page fault, in response to this first fault the processor may provide the addresses for the instructions at arrows 2 through 6 as a hint to the page fault handler. The page fault handler may then analyze the hints and may decide to bring in one of more of the hinted pages and thereby avoid one or more of the future faults.

In the following example, an embodiment may provide a hint that provides the RSI source as a read of 10 pages (or less) and the RDI Destination as a write of 10 Pages (or less), if a page fault occurs:

MOV RCX, 4096*10/4
REP MOVSD <HINT>

In the following example, an embodiment may provide a loop unroll hint.

XOR RDX, RDX
LoopTarget:
   MOV RAX, SIZE IMAGE_DATA
   LEA R14, [RSI]
   ADD R14, RAX
   CMP [R14+10], 0 <HINT>
   JE SkipBackgroundColor
   MOV RAX, [R14]
   MOV [R14+10], RAX
   MOV [R14], 0
SkipBackgroundColor:
   ADD RSI, SIZE IMAGE_INFORMATION
   CMP RDX, R9
   JB LoopTarget For example, a page fault at the indicated location may cause an embodiment to determine the loop iterations and an estimate of the size of the data in RSI and provide an additional hint that indicates the same.

In the following example, an embodiment may provide a look ahead hint:

MOV [RBX+10], EAX <HINT>
MOV [RDX+20], EAX
MOV [RBX+256], EAX
INC EAX
MOV [AddressLabel1], EAX
MOV [AddressLabel2], 0
XOR RAX, RAX
MOV AL, [RDI+8]

For example, a page fault at the indicated location may cause an embodiment to look ahead to hint RDX and RBX+256 (if the addresses cross a page boundary) and AddressLabel1, AddressLabel2, and RDI.

Figure 5:
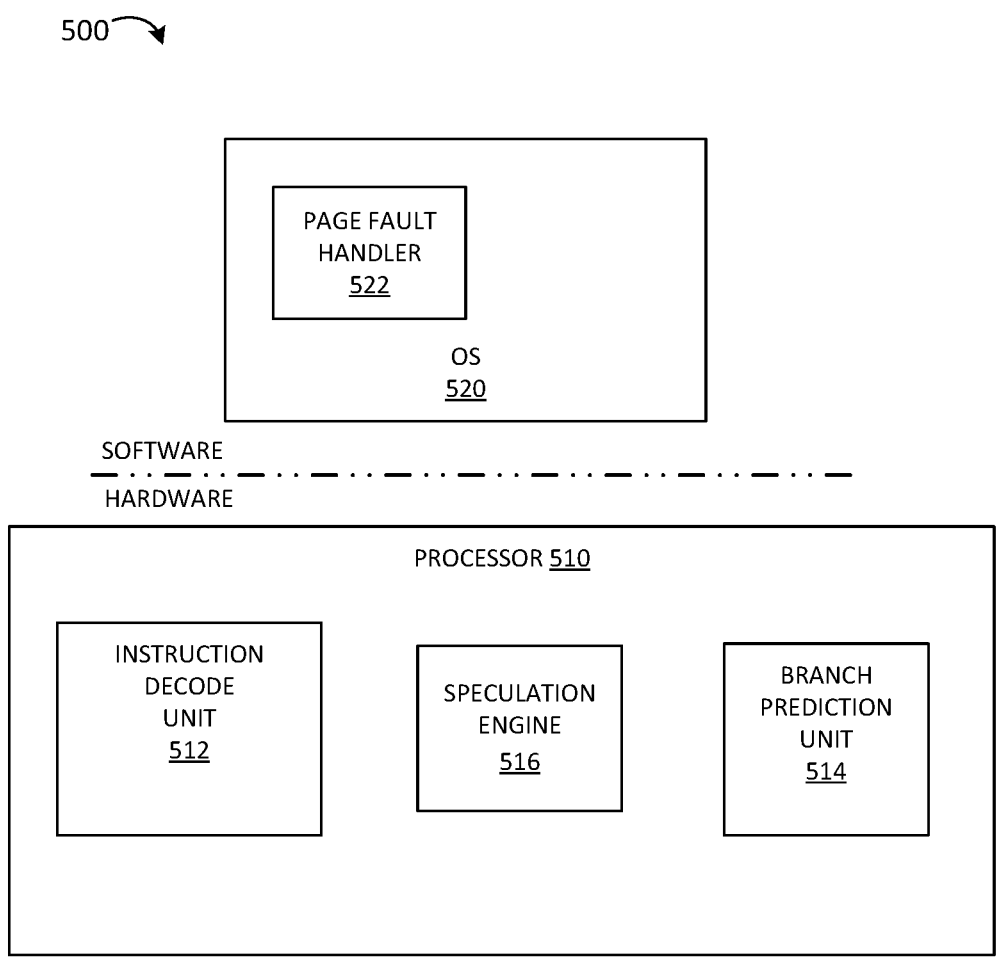
FIG. 5 is a block diagram of an example of a compute system according to an embodiment.

With reference to FIG. 5, an embodiment of a compute system 500 includes a processor 510 and an OS 520 that support speculative page fault technology. For example, the processor 510 includes an instruction decode unit 512, a branch prediction unit 514, and a speculation engine 516. The speculation engine 516 (e.g., on a hardware side of the system 500) is configured to predict future page faults and provide hints to a page fault handler 522 (e.g., on a software side of the system 500). All page fault requests from the instruction decode unit 512 may go through the speculation engine 516. The speculation engine 516 has access to information from the instruction decode unit 512 (e.g., the instruction cache and queues, etc.) and the branch prediction unit 514 (e.g., branches predicted to be taken or not, etc.), and the speculation engine 516 predicts future page faults. For example, the speculation engine 516 may look ahead in the instruction cache or queue for additional addresses that may cause page faults. The speculation engine 516 may take speculative execution into account, and/or may decide to ignore branches or to use the branch prediction information. The speculation engine 516 may further predict whether a page fault likely involves additional size (e.g., if the decoded instruction is in a loop). The speculation engine 516 then uses the information and predictions to build a speculative page fault list, which is then provided as hint information from the processor 510 to the page fault handler 522.

Any suitable technology or techniques may be utilized to provide the hint information from the processor 510 to the page fault handler 522. For example, the hint information may be passed from the processor 510 to the page fault handler 522 as a complete packet of information that includes the faulted page information and the hint information (e.g. a push of the hint information). Alternatively, the processor 510 may provide just the conventional page fault information to the page fault handler 522, and the page fault handler 522 may be configured to check for the availability of the hint information upon receipt of the page fault (e.g., a pull of the hint information triggered by the initiation of a page fault).

In some embodiments, instead of or in addition to specific hint instructions, a shared memory location or a shared register (e.g., such as a model specific register (MSR)) may be utilized to communicate the hint information to the OS 520 and/or the page fault handler 522. In some embodiments, the processor 510 may set a status bit (e.g., in a MSR) when delivering a page fault, to inform the OS 520 that hint information is available. For example, instead of a specific page to fault along with the hint(s), the processor 510 could set the state of a specific MSR with a request for the page fault and an address of further hint information. The software may then clear the state from the MSR when the page fault is done. In this embodiment, the page fault handler 522 may be configured to check the MSR all or most page fault activity.

Figure 6:
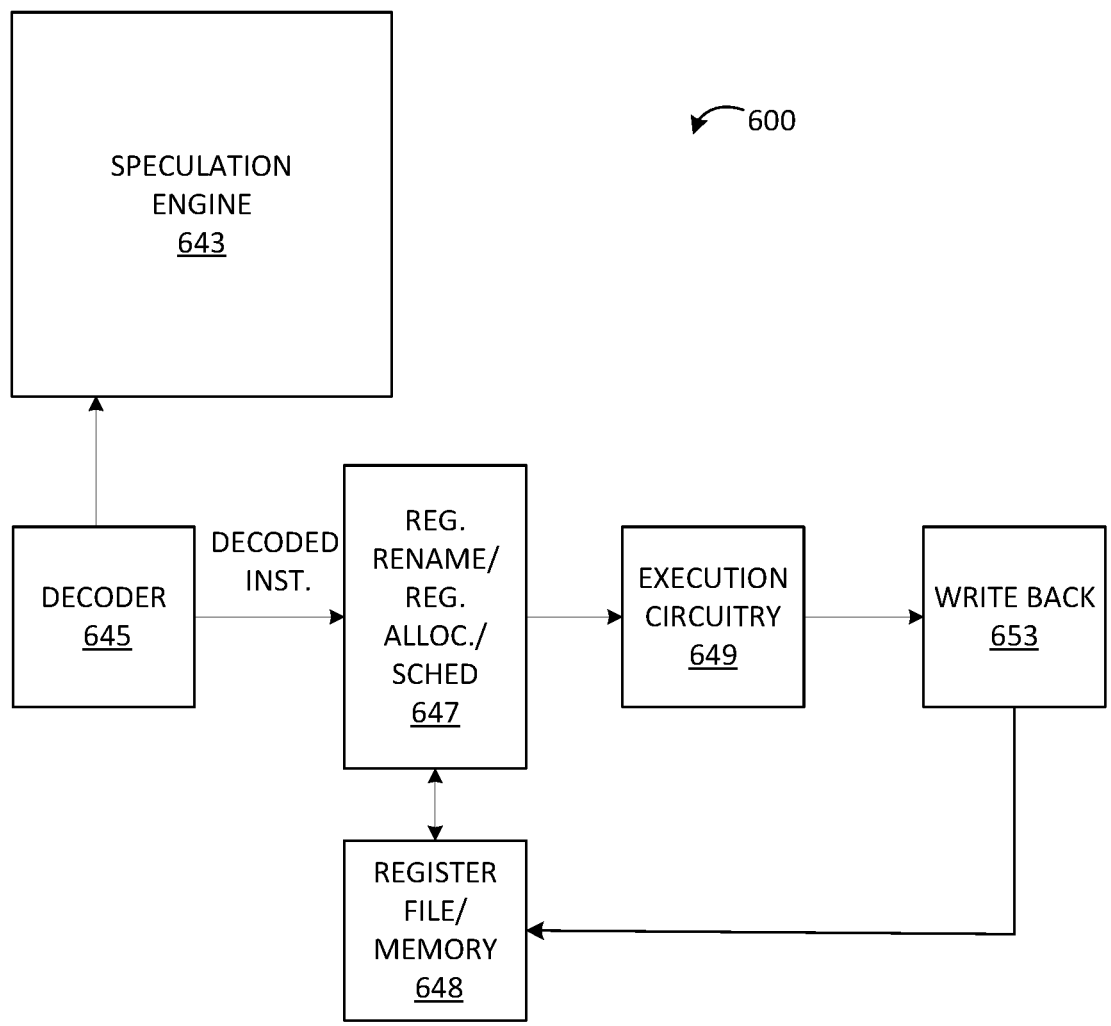
FIG. 6 is a block diagram of an example of hardware according to an embodiment.

FIG. 6 illustrates an embodiment of hardware 600 to provide a speculative page fault list. Decode circuitry 645 may be configured to decode a single instruction, the single instruction to include a field for an opcode, and execution circuitry 649 to execute the decoded instruction according to the opcode. A speculation engine 643 determines hint information for predicted page faults that go along with a page fault from a decoded instruction. For example, the speculation engine 643 may be similarly configured as the speculation engine 516 (e.g., or otherwise include one or more features or aspects of the embodiments described herein).

For example, the decode circuitry 645 receives this instruction from fetch logic/circuitry. The instruction includes fields for an opcode, a source, and a destination. In some embodiments, the source and destination are registers, and in other embodiments one or more are memory locations. In some embodiments, the opcode details which SNC store operation is to be performed and what the preferred SNC memory allocation policy is for that SNC store operation.

The decode circuitry 645 decodes the instruction into one or more operations. In some embodiments, this decoding includes generating a plurality of micro-operations to be performed by execution circuitry (such as execution circuitry 649). The decode circuitry 645 also decodes instruction prefixes.

In some embodiments, register renaming, register allocation, and/or scheduling circuitry 647 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 648 store data as operands of the instruction to be operated on by execution circuitry 649. Exemplary register types include packed data registers, general purpose registers, and floating point registers.

Execution circuitry 649 executes the decoded instruction. Exemplary detailed execution circuitry is shown in FIG. 8B, etc. The execution of the decoded instruction causes the execution circuitry 649 to execute the decoded instruction according to the opcode. In some embodiments, the single instruction further includes a field for an identifier of a source operand and a field for an identifier of a destination operand, and the execution circuitry 649 is further to execute the decoded instruction according to the opcode to retrieve source information from a location indicated by the source operand, and store the source information to a location indicated by the destination operand.

In some embodiments, retirement/write back circuitry 653 architecturally commits the destination register into the registers or memory 648 and retires the instruction.

Figure 7:
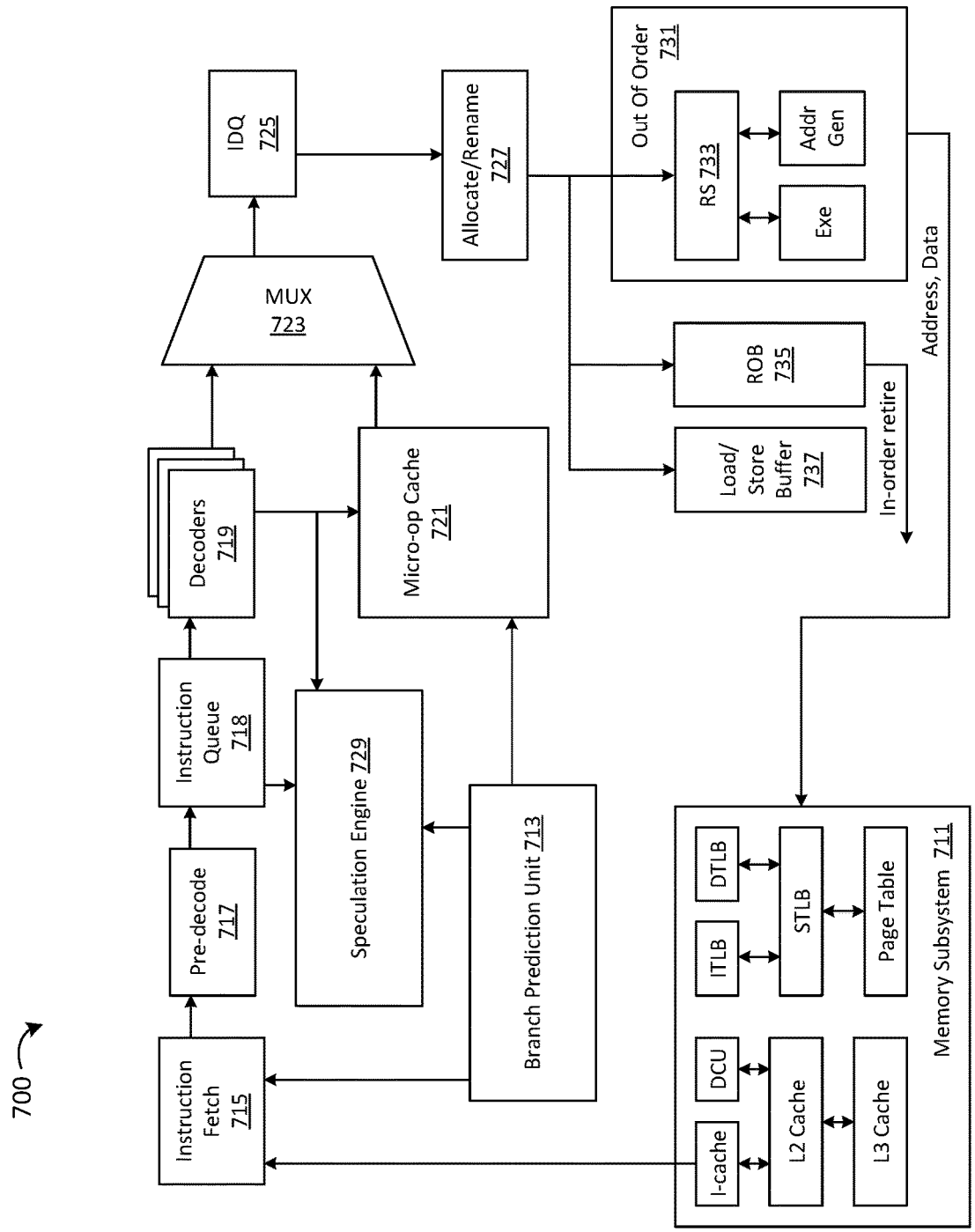
FIG. 7 is a block diagram of an example of an out-of-order processor according to an embodiment.

With reference to FIG. 7, an embodiment of an out-of-order (OOO) processor core 700 includes a memory subsystem 711, a branch prediction unit (BPU) 713, an instruction fetch circuit 715, a pre-decode circuit 717, an instruction queue 718, decoders 719, a micro-op cache 721, a mux 723, an instruction decode queue (IDQ) 725, an allocate/rename circuit 727, a speculation engine 729, an out-of-order core 731, a reservation station (RS) 733, a re-order buffer (ROB) 735, and a load/store buffer 737, connected as shown. The memory subsystem 711 includes a level-1 (L1) instruction cache (I-cache), a L1 data cache (DCU), a L2 cache, a L3 cache, an instruction translation lookaside buffer (ITLB), a data translation lookaside buffer (DTLB), a shared translation lookaside buffer (STLB), and a page table, connected as shown. The OOO core 731 includes a reservation station (RS), an Exe circuit, and an address generation circuit, connected as shown. The speculation engine 729 determines hint information for predicted page faults that go along with a page fault from a decoded instruction. For example, the speculation engine 729 may be similarly configured as the speculation engine 516 (e.g., or otherwise include one or more features or aspects of the embodiments described herein).

Those skilled in the art will appreciate that a wide variety of devices may benefit from the foregoing embodiments.

The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 8B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9A:
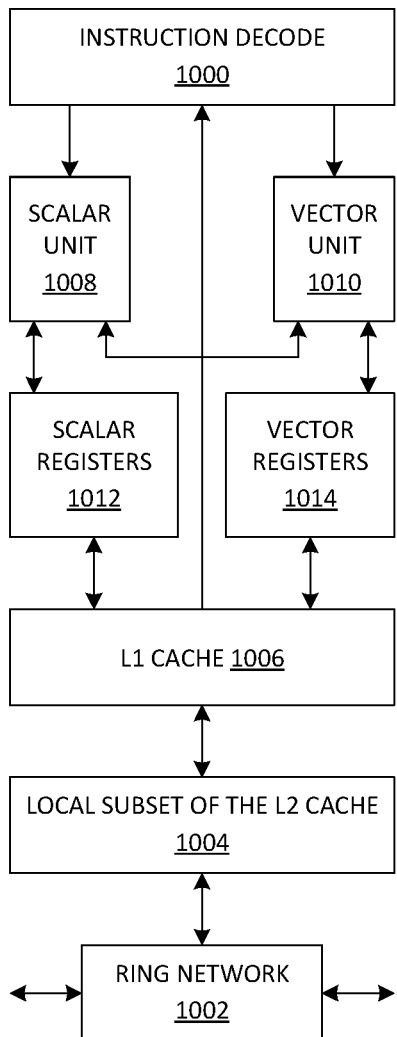
FIGS. 9A-B illustrate a block diagram of a more specific exemplary in-order core architecture, which core would be one of several logic blocks (including other cores of the same type and/or different types) in a chip.
Figure 9B:
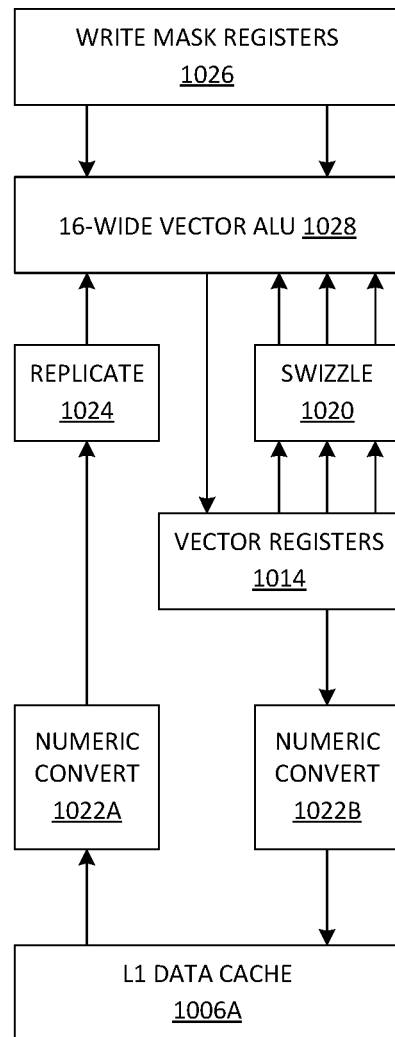

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 10:
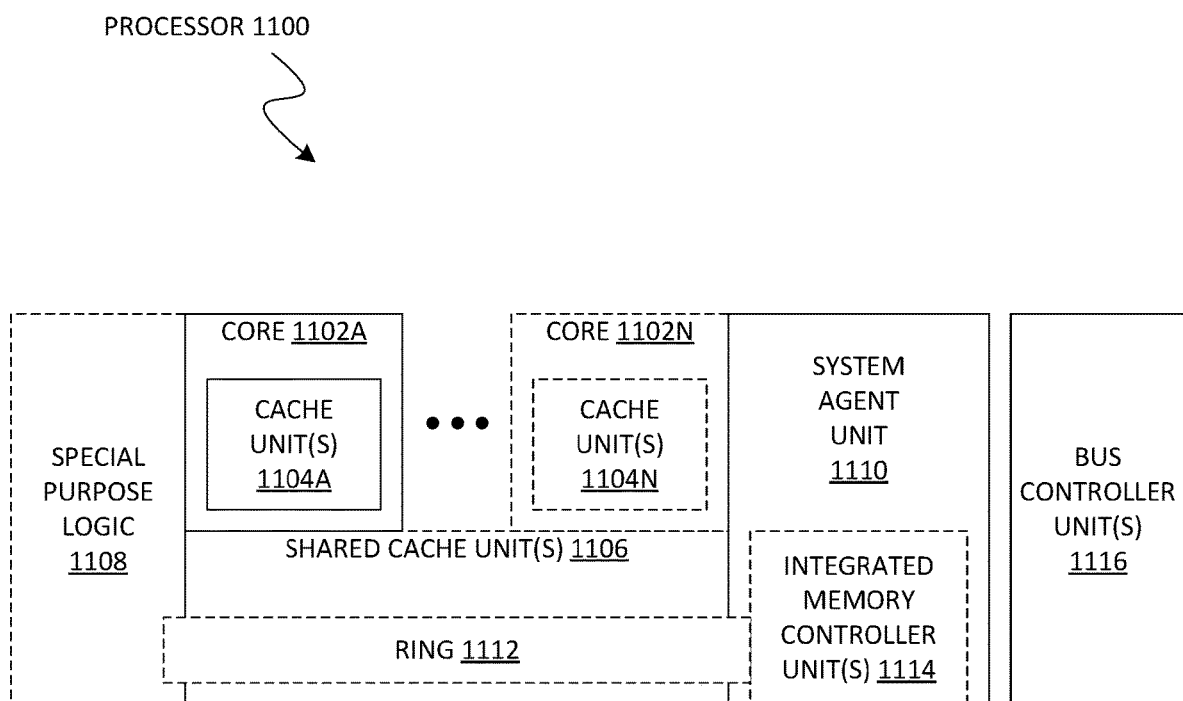
FIG. 10 is a block diagram of a processor that may have more than one core, may have an integrated memory controller, and may have integrated graphics according to embodiments of the invention.

FIG. 10 is a block diagram of a processor 1100 that may have more than one core, may have an integrated memory controller, and may have integrated graphics according to embodiments of the invention. The solid lined boxes in FIG. 10 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
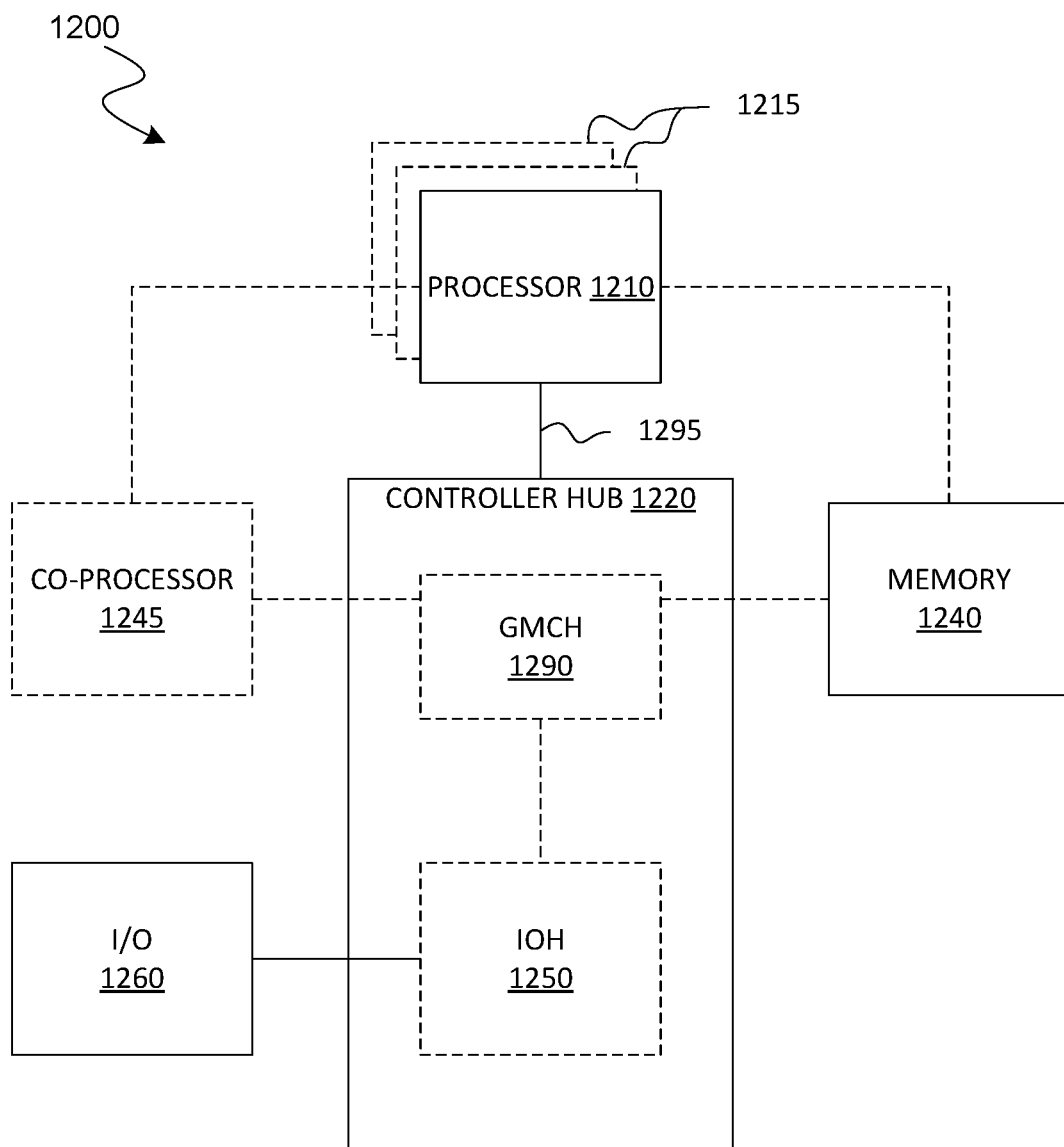
FIGS. 11-14 are block diagrams of exemplary computer architectures.

Referring now to FIG. 11, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 11 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 12:
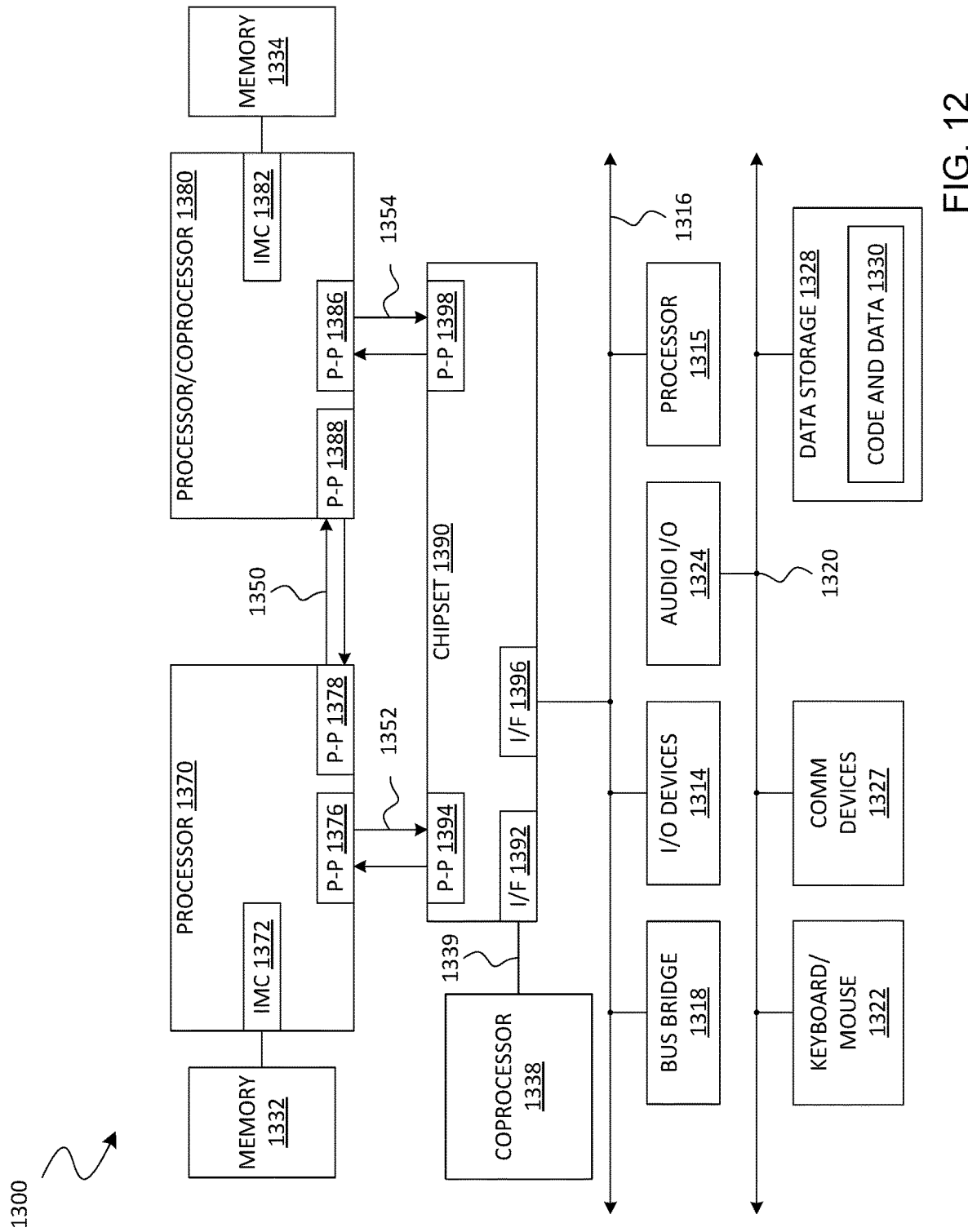

Referring now to FIG. 12, shown is a block diagram of a first more specific exemplary system 1300 in accordance with an embodiment of the present invention. As shown in FIG. 12, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 12, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 12, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 12, a system may implement a multi-drop bus or other such architecture.

Figure 13:
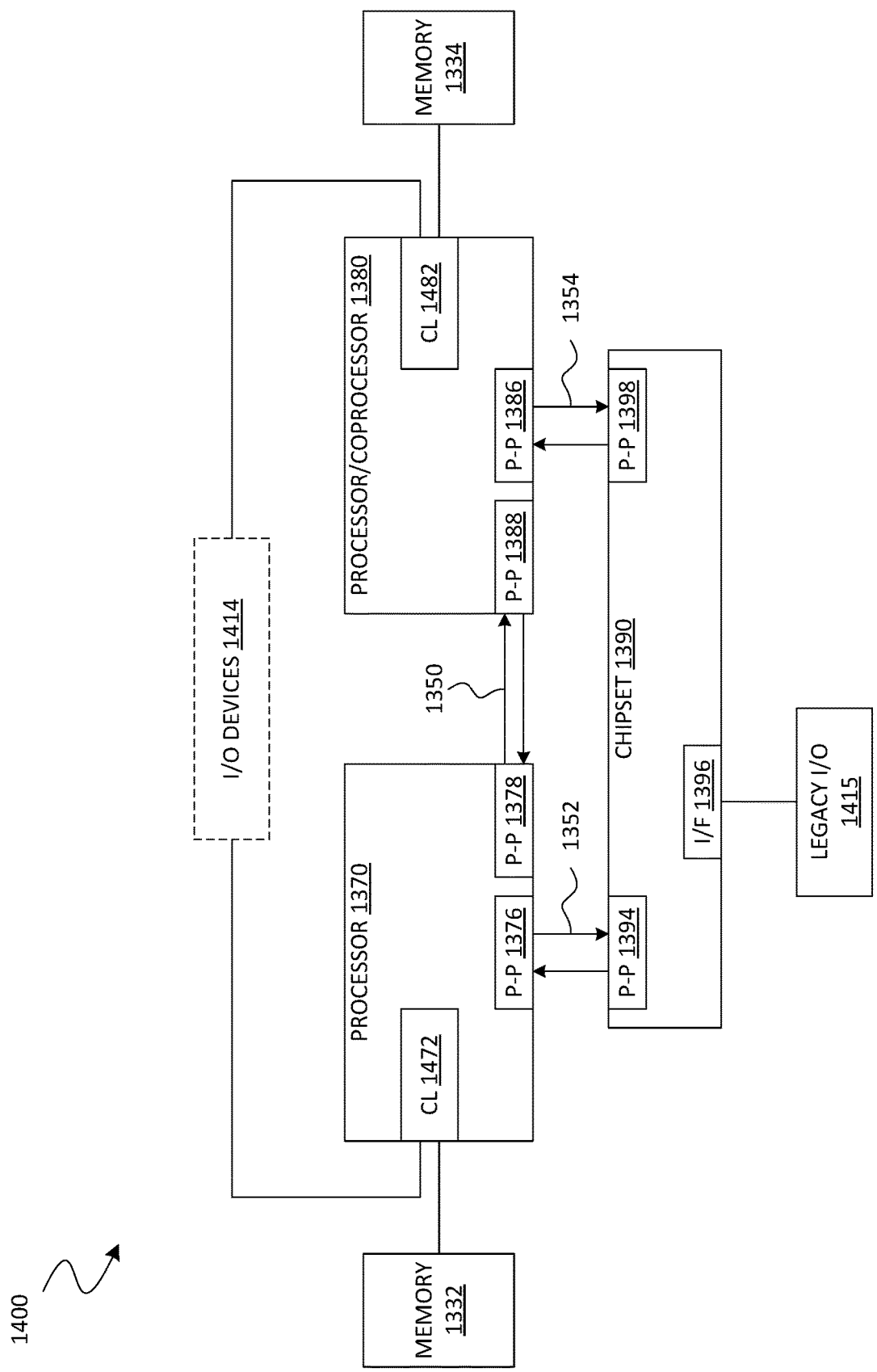

Referring now to FIG. 13, shown is a block diagram of a second more specific exemplary system 1400 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1370, 1380 may include integrated memory and I/O control logic ("CL") 1472 and 1482, respectively. Thus, the CL 1472, 1482 include integrated memory controller units and include I/O control logic. FIG. 13 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 14, shown is a block diagram of a SoC 1500 in accordance with an embodiment of the present invention. Similar elements in FIG. 10 bear like reference numerals. Also, dashed lined boxes are optional features on more advanced SoCs. In FIG. 14, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114;

a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 15 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for core-based page fault speculation are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

ADDITIONAL NOTES AND EXAMPLES

Example 1 includes an integrated circuit, comprising an instruction decoder to decode one or more instructions to be executed by a core, and circuitry coupled to the instruction decoder, the circuitry to determine if a decoded instruction involves a page to be fetched, and determine one or more hints for one or more optional pages that may be fetched along with the page for the decoded instruction.

Example 2 includes the integrated circuit of Example 1, wherein the one or more hints comprise a speculative page fault list of optional pages that may be fetched.

Example 3 includes the integrated circuit of Example 2, wherein the circuitry is further to look ahead at one or more instructions to be decoded to add one or more optional pages that may be fetched to the speculative page fault list.

Example 4 includes the integrated circuit of any of Examples 1 to 3, wherein the one or more hints comprise a speculative size of memory that may be fetched for one or more of the page to be fetched and an optional page that may be fetched, where the speculative size is greater than a single page size.

Example 5 includes the integrated circuit of Example 4, wherein the one or more hints comprise a speculative page fault list of additional speculative addresses of pages that may be fetched together with respective speculative sizes for the address of the page to be fetched for the decoded instruction and the additional speculative addresses.

Example 6 includes the integrated circuit of any of Examples 1 to 5, wherein the circuitry is further to determine a hint for at least one additional page that may be fetched that is unrelated to the page to be fetched for the decoded instruction.

Example 7 includes the integrated circuit of any of Examples 1 to 6, wherein the circuitry is further to provide the one or more hints from the core to a page fault handler.

Example 8 includes a method, comprising decoding one or more instructions to be executed by a core, determining if a decoded instruction involves a page to be fetched, and determining one or more hints for one or more optional pages that may be fetched along with the page for the decoded instruction.

Example 9 includes the method of Example 8, wherein the one or more hints comprise a speculative page fault list of optional pages that may be fetched.

Example 10 includes the method of Example 9, further comprising looking ahead at one or more instructions to be decoded to add one or more optional pages that may be fetched to the speculative page fault list.

Example 11 includes the method of any of Examples 8 to 10, wherein the one or more hints comprise a speculative size of memory that may be fetched for one or more of the page to be fetched and an optional page that may be fetched, where the speculative size is greater than a single page size.

Example 12 includes the method of Example 11, wherein the one or more hints comprise a speculative page fault list of additional speculative addresses of pages that may be fetched together with respective speculative sizes for the address of the page for the decoded instruction and the additional speculative addresses.

Example 13 includes the method of any of Examples 8 to 12, further comprising determining a hint for at least one additional page that may be fetched that is unrelated to the page to be fetched for the decoded instruction.

Example 14 includes the method of any of Examples 8 to 13, further comprising providing the one or more hints from the core to a page fault handler.

Example 15 includes an apparatus, comprising a core with a front end unit to decode one or more instructions and a back end unit communicatively coupled to the front end unit to execute the one or more decoded instructions, the front end unit including circuitry to determine if a decoded instruction involves a page to be fetched, and determine one or more hints for one or more optional pages that may be fetched along with the page for the decoded instruction.

Example 16 includes the apparatus of Example 15, wherein the one or more hints comprise a speculative page fault list of optional pages that may be fetched.

Example 17 includes the apparatus of Example 16, wherein the circuitry is further to look ahead at one or more instructions to be decoded to add one or more optional pages that may be fetched to the speculative page fault list.

Example 18 includes the apparatus of any of Examples 15 to 17, wherein the one or more hints comprise a speculative size of memory that may be fetched for one or more of the page to be fetched and an optional page that may be fetched, where the speculative size is greater than a single page size.

Example 19 includes the apparatus of Example 18, wherein the one or more hints comprise a speculative page fault list of additional speculative addresses of pages that may be fetched together with respective speculative sizes for the address of the page to be fetched for the decoded instruction and the additional speculative addresses.

Example 20 includes the apparatus of any of Examples 15 to 19, wherein the circuitry is further to determine a hint for at least one additional page that may be fetched that is unrelated to the page to be fetched for the decoded instruction.

Example 21 includes the apparatus any of Examples 15 to 20, wherein the circuitry is further to provide the one or more hints from the core to a page fault handler.

Example 22 includes an apparatus, comprising means for decoding one or more instructions to be executed by a core, means for determining if a decoded instruction involves a page to be fetched, and means for determining one or more hints for one or more optional pages that may be fetched along with the page for the decoded instruction.

Example 23 includes the apparatus of Example 22, wherein the one or more hints comprise a speculative page fault list of optional pages that may be fetched.

Example 24 includes the apparatus of Example 23, further comprising means for looking ahead at one or more instructions to be decoded to add one or more optional pages that may be fetched to the speculative page fault list.

Example 25 includes the apparatus of any of Examples 22 to 24, wherein the one or more hints comprise a speculative size of memory that may be fetched for one or more of the page to be fetched and an optional page that may be fetched, where the speculative size is greater than a single page size.

Example 26 includes the apparatus of Example 25, wherein the one or more hints comprise a speculative page fault list of additional speculative addresses of pages that may be fetched together with respective speculative sizes for the address of the page for the decoded instruction and the additional speculative addresses.

Example 27 includes the apparatus of any of Examples 22 to 26, further comprising means for determining a hint for at least one additional page that may be fetched that is unrelated to the page to be fetched for the decoded instruction.

Example 28 includes the apparatus of any of Examples 22 to 27, further comprising means for providing the one or more hints from the core to a page fault handler.

Example 29 includes at least one non-transitory machine readable medium comprising a plurality of instructions that, in response to being executed on a computing device, cause the computing device to decode one or more instructions to be executed by a core, determine if a decoded instruction involves a page to be fetched, and determine one or more hints for one or more optional pages that may be fetched along with the page for the decoded instruction.

Example 30 includes the at least one non-transitory machine readable medium of Example 29, wherein the one or more hints comprise a speculative page fault list of optional pages that may be fetched.

Example 31 includes the at least one non-transitory machine readable medium of Example 30, comprising a plurality of further instructions that, in response to being executed on the computing device, cause the computing device to look ahead at one or more instructions to be decoded to add one or more optional pages that may be fetched to the speculative page fault list.

Example 32 includes the at least one non-transitory machine readable medium of any of Examples 29 to 31, wherein the one or more hints comprise a speculative size of memory that may be fetched for one or more of the page to be fetched and an optional page that may be fetched, where the speculative size is greater than a single page size.

Example 33 includes the at least one non-transitory machine readable medium of Example 32, wherein the one or more hints comprise a speculative page fault list of additional speculative addresses of pages that may be fetched together with respective speculative sizes for the address of the page for the decoded instruction and the additional speculative addresses.

Example 34 includes the at least one non-transitory machine readable medium of any of Examples 29 to 33, comprising a plurality of further instructions that, in response to being executed on the computing device, cause the computing device to determine a hint for at least one additional page that may be fetched that is unrelated to the page to be fetched for the decoded instruction.

Example 35 includes the at least one non-transitory machine readable medium of any of Examples 29 to 34, comprising a plurality of further instructions that, in response to being executed on the computing device, cause the computing device to provide the one or more hints from the core to a page fault handler.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
an instruction decoder comprising first circuitry to decode one or more instructions to be executed by a core of a processor which is to include the integrated circuit; and
second circuitry coupled to the instruction decoder, the second circuitry to:
determine if a decoded instruction involves a page to be fetched;
determine one or more hints for one or more optional pages that are subject to being fetched along with the page for the decoded instruction; and
provide the one or more hints to a page fault handler that is to be executed with the core;

wherein:
the one or more hints comprise:
a speculative size of memory that is subject to being fetched for one or more of:
the page to be fetched; and
an optional page that is subject to being fetched; and
a speculative page fault list of speculative addresses of pages that are subject to being fetched together with respective speculative sizes for an address of the page to be fetched for the decoded instruction and the speculative addresses; and
the speculative size is greater than a single page size.

2. The integrated circuit of claim 1, wherein the second circuitry is further to:
look ahead at one or more instructions to be decoded to add one or more optional pages that are subject to being fetched to the speculative page fault list.

3. The integrated circuit of claim 1, wherein the second circuitry is further to:
determine a hint for at least one additional page that is subject to being fetched that is unrelated to the page to be fetched for the decoded instruction.

4. A method, comprising:
with first circuitry at a front end of a processor, decoding one or more instructions to be executed by a core of the processor; and
with second circuitry at the front end of the processor:
determining if a decoded instruction involves a page to be fetched;
determining one or more hints for one or more optional pages that may be are subject to being fetched along with the page for the decoded instruction; and
providing the one or more hints to a page fault handler that is executing at the processor;
wherein:
the one or more hints comprise:
a speculative size of memory that is subject to being fetched for one or more of:
the page to be fetched; and
an optional page that is subject to being fetched; and
a speculative page fault list of speculative addresses of pages that are subject to being fetched together with respective speculative sizes for an address of the page to be fetched for the decoded instruction and the speculative addresses; and
the speculative size is greater than a single page size.

5. The method of claim 4, further comprising:
looking ahead at one or more instructions to be decoded to add one or more optional pages that are subject to being fetched to the speculative page fault list.

6. The method of claim 4, further comprising:
determining a hint for at least one additional page that is subject to being fetched that is unrelated to the page to be fetched for the decoded instruction.

7. An apparatus, comprising:
a core with a front end unit to decode one or more instructions and a back end unit communicatively coupled to the front end unit to execute the one or more decoded instructions, the front end unit including circuitry to:
determine if a decoded instruction involves a page to be fetched;
determine one or more hints for one or more optional pages that are subject to being fetched along with the page for the decoded instruction; and
provide the one or more hints from the core to a page fault handler that is to be executed with the core;
wherein:
the one or more hints comprise:
a speculative size of memory that is subject to being fetched for one or more of:
the page to be fetched; and
an optional page that is subject to being fetched; and
a speculative page fault list of speculative addresses of pages that are subject to being fetched together with respective speculative sizes for an address of the page to be fetched for the decoded instruction and the speculative addresses; and
the speculative size is greater than a single page size.

8. The apparatus of claim 7, wherein the circuitry is further to:
look ahead at one or more instructions to be decoded to add one or more optional pages that are subject to being fetched to the speculative page fault list.

9. The apparatus of claim 7, wherein the circuitry is further to:
determine a hint for at least one additional page that is subject to being fetched that is unrelated to the page to be fetched for the decoded instruction.

* * * * *